(12) United States Patent
Lin

(10) Patent No.: US 10,063,038 B1
(45) Date of Patent: Aug. 28, 2018

(54) PROGRAMMABLE AC POWER DISTRIBUTION UNIT

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 15/694,182

(22) Filed: Sep. 1, 2017

(51) Int. Cl.
| | |
|---|---|
| *H02B 1/24* | (2006.01) |
| *H02B 1/26* | (2006.01) |
| *H02B 1/04* | (2006.01) |
| *H02B 1/20* | (2006.01) |
| *H02B 1/56* | (2006.01) |

(52) U.S. Cl.
CPC ............... *H02B 1/26* (2013.01); *H02B 1/04* (2013.01); *H02B 1/20* (2013.01); *H02B 1/24* (2013.01); *H02B 1/56* (2013.01)

(58) Field of Classification Search
CPC ... H02B 1/26; H02B 1/04; H02B 1/20; H02B 1/24; H02B 1/56
USPC ......................................................... 361/624
See application file for complete search history.

(56) References Cited

U.S. PATENT DOCUMENTS

| | | | | |
|---|---|---|---|---|
| 3,192,446 | A * | 6/1965 | Meacham ............... | H02B 1/056 361/634 |
| 3,219,887 | A * | 11/1965 | Gerg ........................ | H02B 1/21 174/99 B |
| 3,346,777 | A * | 10/1967 | Leonard .................. | H02B 1/056 361/636 |
| 5,067,043 | A * | 11/1991 | Markowski ............ | H02B 1/056 361/611 |
| 8,305,739 | B2 * | 11/2012 | Dozier ................... | H02B 1/056 174/50 |
| 8,553,382 | B2 * | 10/2013 | Coffey ................... | H02H 9/004 361/65 |
| 9,632,548 | B1 * | 4/2017 | Lin .......................... | G06F 1/20 |
| 9,876,333 | B2 * | 1/2018 | Dozier ................... | H02B 1/052 |
| 9,893,499 | B2 * | 2/2018 | Crowell .................. | H02B 1/14 |
| 2010/0290174 | A1* | 11/2010 | Harrison ................ | H02B 1/205 361/601 |
| 2016/0233649 | A1* | 8/2016 | Baillargeon ......... | H01R 25/162 |

* cited by examiner

*Primary Examiner* — Anatoly Vortman
(74) *Attorney, Agent, or Firm* — Ming Chow; Sinorica, LLC

(57) ABSTRACT

A programmable AC power distribution unit includes a case and a network connection and power parameter measuring circuit board disposed in the case. The circuit board is connected with a panel, and the circuit board may be connected with an external network. In addition, a bus bar assembly is provided in the middle of the case. Current detectors are provided on the bus bar assembly. Two sides of the bus bar assembly are provided with a plurality of electromagnetic switches which are disposed in the case. The electromagnetic switches can be turned on/off through the panel or the remote network. The programmable AC power distribution unit has the function of monitoring the quality of the power supply and has the advantages of programmable automatic control and power distribution, meeting the network and automation requirements of Industry 4.0.

9 Claims, 6 Drawing Sheets

PROGRAMMABLE AC POWER DISTRIBUTION UNIT

FIELD OF THE INVENTION

The present invention relates to a programmable AC power distribution unit.

BACKGROUND OF THE INVENTION

In general, a power supply end of a load having a plurality of electrical devices, such as rack-mounted devices, is provided with a main distribution board to turn on/off the power supply. The electricity or power quality is detected manually. When the load is abnormal, it is necessary to switch off the power circuit through the main distribution board to avoid danger.

With the development of the Internet of Things (IOT), many factories have gradually developed towards the current trend of "computerization, digitization and intelligence" of Industry 4.0. A data center is the heart and lifeblood of a company. In order to ensure smooth operation, the power management and monitoring are performed manually, which is time-consuming and labor-consuming. Accordingly, the inventor of the present invention has devoted himself based on his many years of practical experiences to solve these problems.

SUMMARY OF THE INVENTION

The primary object of the present invention is to provide a programmable AC power distribution unit which can monitor the data of the input power supply, maintenance the electricity quality, and automatically control the opening and closing of the power distribution, and control the power supply safely.

In order to achieve the aforesaid object, the programmable AC power distribution unit of the present invention comprises a case, a panel, a front plate, a back plate, a bus bar assembly, a plurality of current detectors, a plurality of electromagnetic switches, and a network connection and power parameter measuring circuit board. The case is placed on a rack and has an accommodation space therein. The panel is disposed at a front of the case. The panel is provided with a main switch, an emergency switch, and a display screen. The main switch, the emergency switch and the display screen are electrically connected. The main switch is electrically connected in series with the emergency switch. The front plate is disposed behind the panel and parallel to the panel. The front plate is located in the accommodation space of the case. The front plate includes an insulating plate. The insulating plate has a plurality of first perforations at a middle portion thereof. The back plate is disposed at a rear of the case. The back plate is parallel to the panel and the front plate. The back plate is provided with a plurality of output terminals. The back plate has a plurality of second perforations corresponding to the first perforations of the front plate. A portion of the back plate, where the second perforations are located, is made of an insulating material. The bus bar assembly has a first end transversely inserted through the first perforations and a second end inserted through the second perforations. The bus bar assembly is located in the accommodation space. The second end of the bus bar assembly extends out of the back plate for connection of an external power supply. The current detectors are fitted on the bus bar assembly. The current detectors are electrically connected with the panel respectively for detecting input current. The electromagnetic switches are disposed in the accommodation space of the case and located at left and right sides of the bus bar assembly, respectively. Input ends of the electromagnetic switches are electrically connected with the bus bar assembly, respectively. Output ends of the electromagnetic switches are electrically connected with the output terminals of the back plate. The network connection and power parameter measuring circuit board is disposed at one side of the case. The network connection and power parameter measuring circuit board is electrically connected with the panel, the current detectors and the electromagnetic switches for measuring various power values of the external power supply.

The programmable AC power distribution unit of the present invention uses the network connection and power parameter measuring circuit board and the current detector to measure various values of the external power supply. The panel is used to control the opening and closing of the electromagnetic switches in order to achieve the purposes of power monitoring and distribution and the maintenance of power quality and safety.

DETAILED DESCRIPTION OF THE PREFERRED EMBODIMENTS

Embodiments of the present invention will now be described, by way of example only, with reference to the accompanying drawings.

Figure 1:
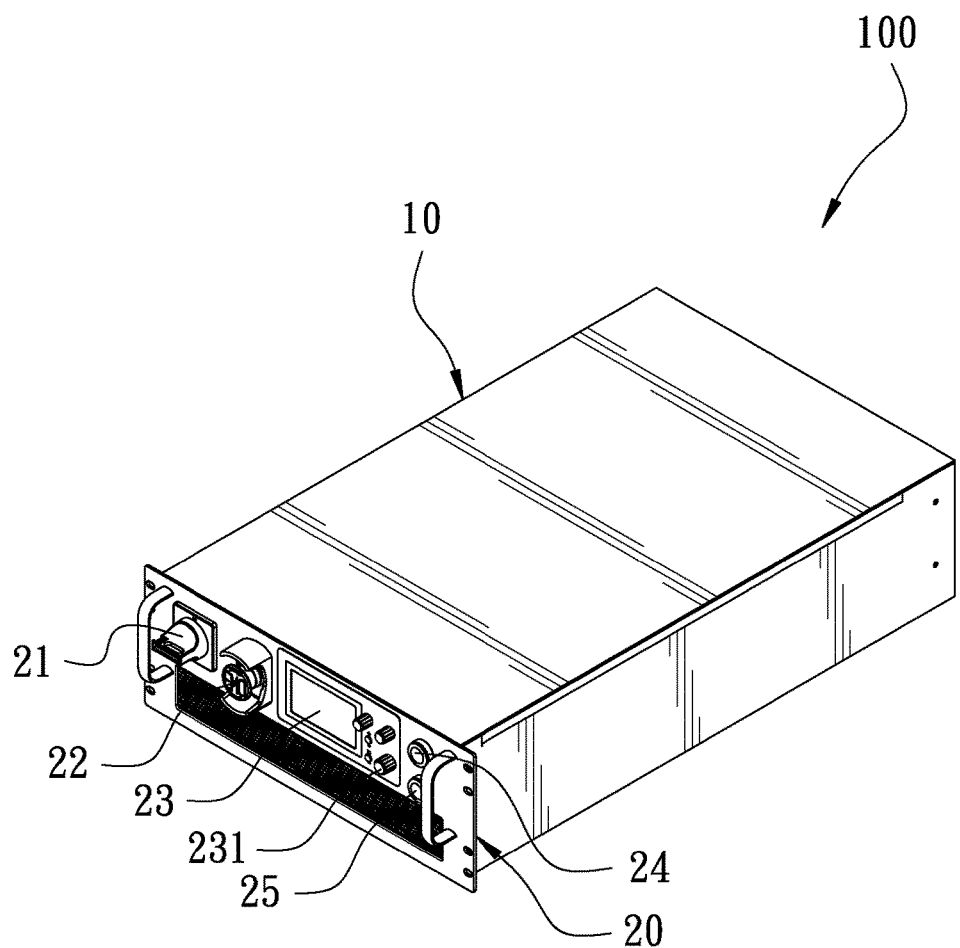
FIG. 1 is a perspective view in accordance with a first embodiment of the present invention.
Figure 2:
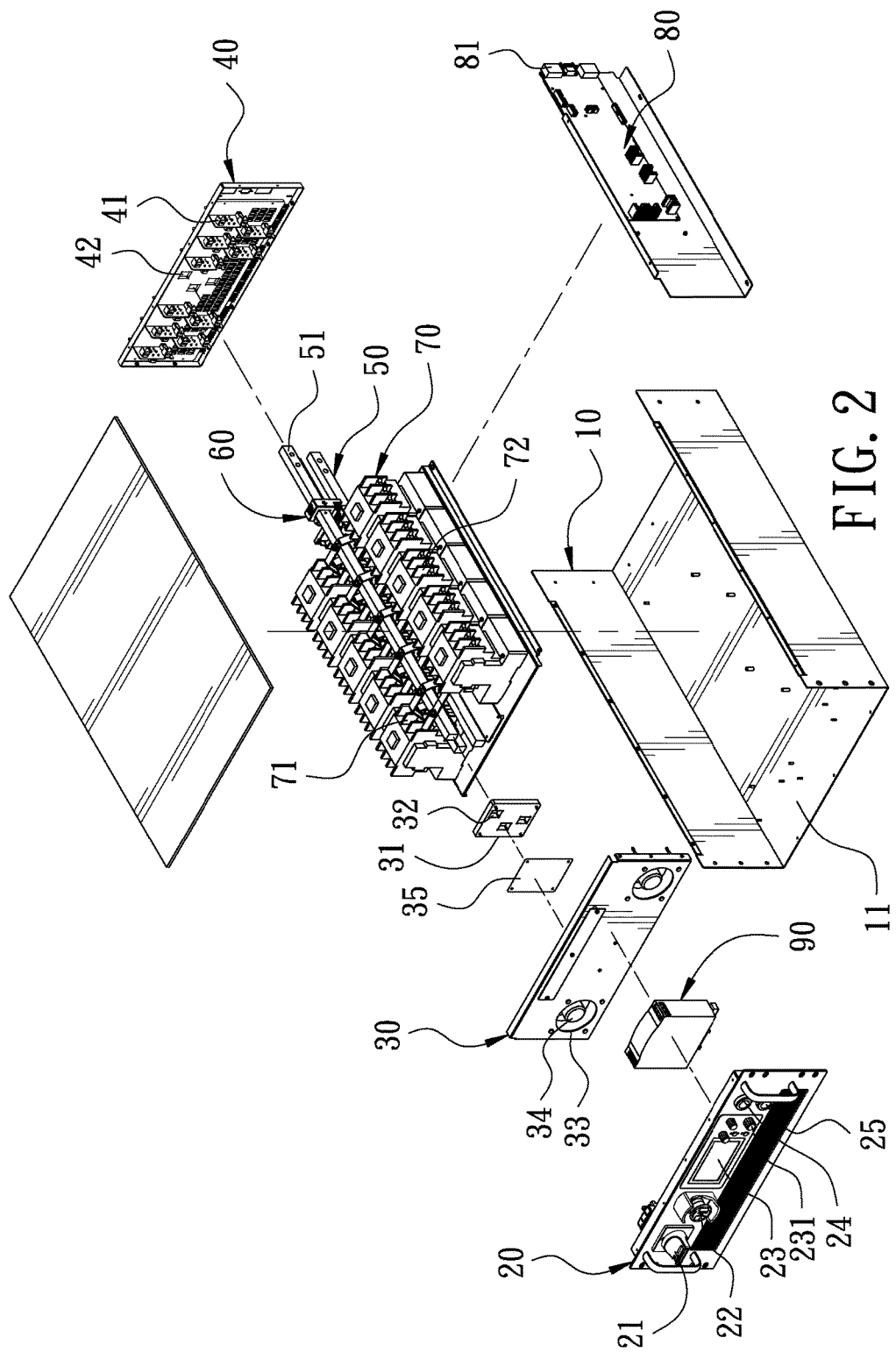
FIG. 2 is an exploded view in accordance with the first embodiment of the present invention.
Figure 4:
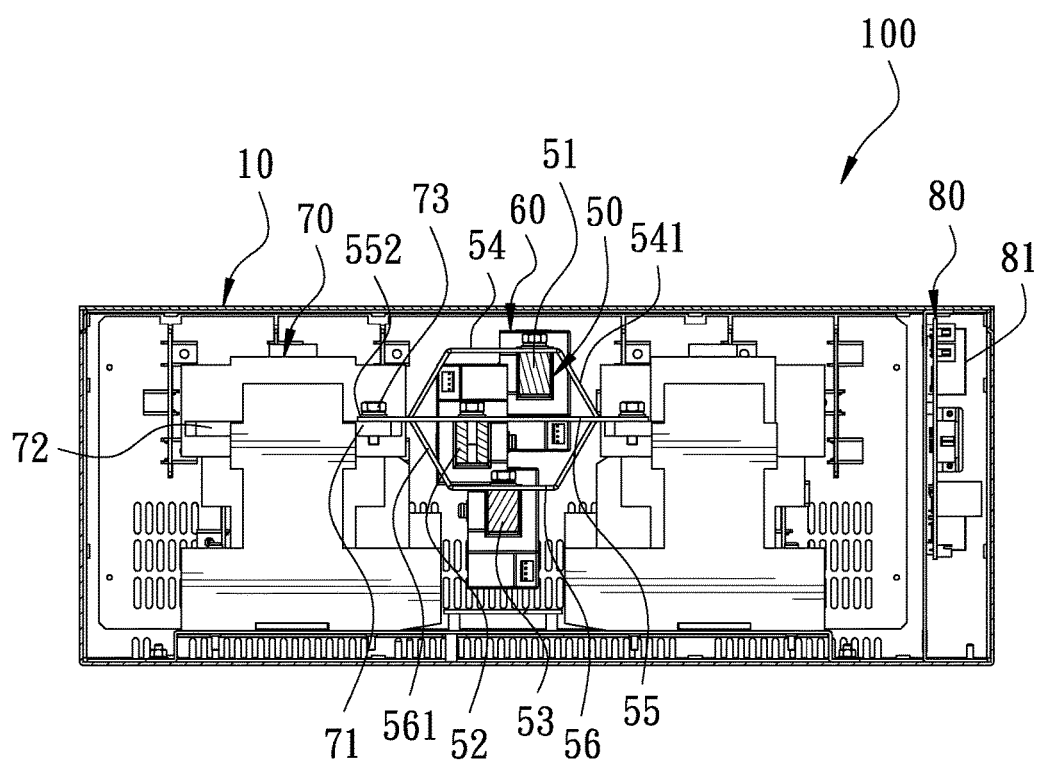
FIG. 4 is a sectional view in accordance with the first embodiment of the present invention.

FIG. 1 is a perspective view in accordance with a first embodiment of the present invention. FIG. 2 is an exploded view in accordance with the first embodiment of the present invention. FIG. 4 is a sectional view in accordance with the first embodiment of the present invention. The present invention discloses a programmable AC power distribution unit 100. The programmable AC power distribution unit 100 comprises a case 10, a panel 20, a front plate 30, a back plate 40, a bus bar assembly 50, a plurality of current detectors 60, a plurality of electromagnetic switches 70, a network connection and power parameter measuring circuit board 80, and a power converter 90.

The case 10 is sized to be placed on a rack (not shown), and has an accommodation space 11 therein.

The panel 20 is disposed at the front of the case 10. The panel 20 is provided with a main switch 21, an emergency switch 22, a display screen 23, an output open button 24 having an indicator light, and an output close button 25 having an indicator light. The main switch 21, the emergency switch 22 and the display screen 23 are electrically connected. The main switch 21 is electrically connected in series with the emergency switch 22. The display screen 23 is provided with a plurality of knobs 231.

The front plate 30 is disposed behind the panel 20 and is parallel to the panel 20. The front plate 30 is located in the accommodation space 11 of the case 10. The front plate 30 includes an insulating plate 31. The insulating plate 31 has a plurality of first perforations 32 at a middle portion thereof. In this embodiment, the insulating plate 31 is made of an insulating bakelite material. The insulating plate 31 has three first perforations 32. The front plate 30 has mounting holes 33 at two sides thereof. Each of the mounting holes 33 is provided with a cooling fan 34. The front plate 30 further includes an insulating sheet 35. The insulating sheet 35 is disposed between the insulating plate 31 and the panel 20.

The back plate 40 is disposed at the rear of the case 10 and is parallel to the panel 20 and the front plate 30. The back plate 40 is provided with a plurality of output terminals 41. The back plate 40 has a plurality of second perforations 42 corresponding to the first perforations 32 of the front plate 30. The back plate 40 is mainly made of a metal material, and a portion of the back plate, where the second perforations 42 are located, is made of an insulating bakelite material.

Figure 3:
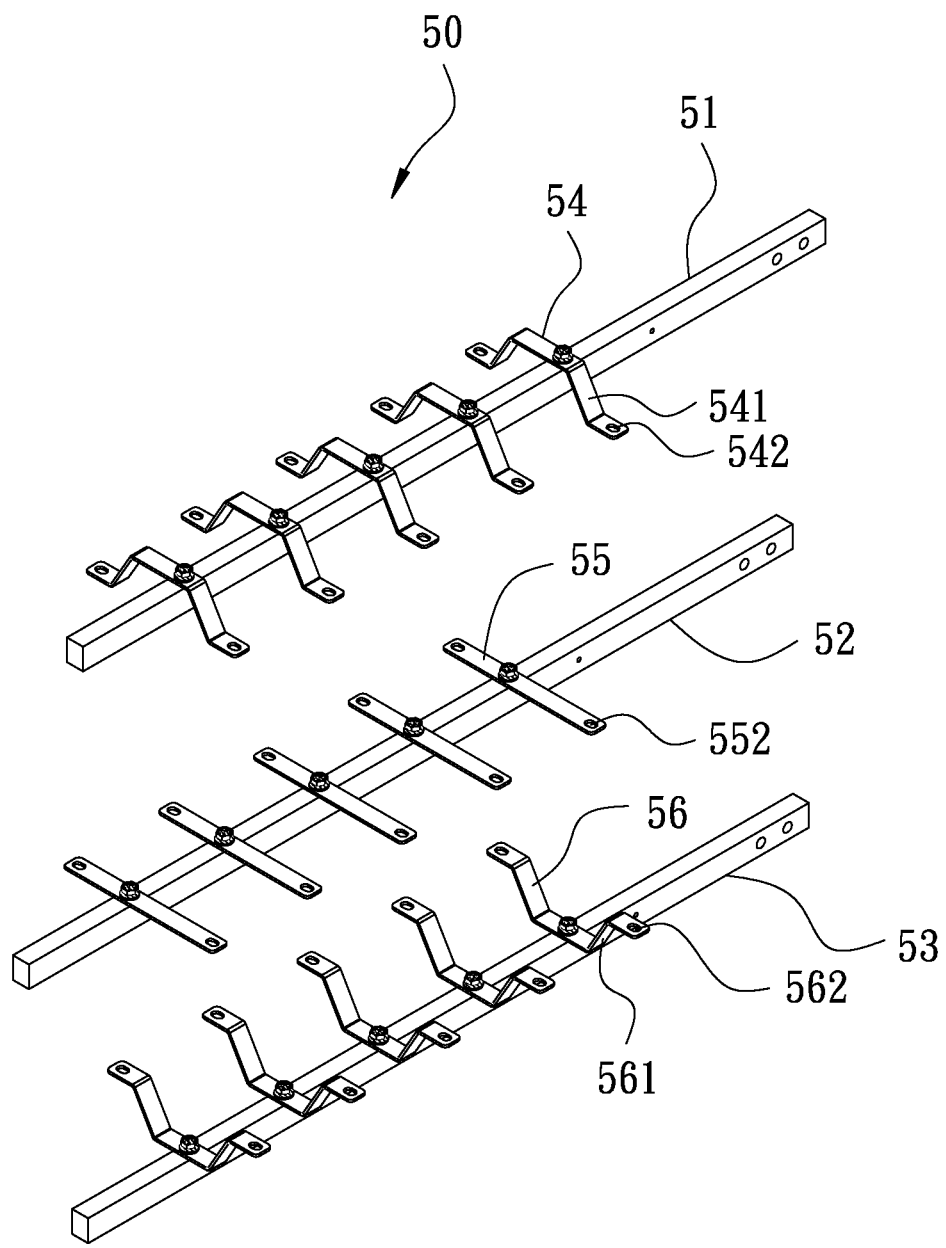
FIG. 3 is an exploded view of the bus bar in accordance with the first embodiment of the present invention.

The bus bar assembly 50, as shown in FIG. 3, has a first end transversely inserted through the first perforations 32 and a second end inserted through the second perforations 42. The bus bar assembly 50 is located in the accommodation space 11, and the second end of the bus bar assembly 50 extends out of the back plate 40 for connection of an external power supply 300. In this embodiment, the external power supply 300 is a three-phase three-wire AC power supply of 180-460V or a three-phase four-wire AC power supply of 180/104-576/332.4V. The bus bar assembly 50 includes a first bus bar 51, a second bus bar 52, and a third bus bar 53. The first bus bar 51 is disposed above the second bus bar 52. The third bus bar 53 is disposed below the second bus bar 52. The first bus bar 51 is transversely provided with a plurality of first conductive plates 54. Two ends of each first conductive plate 54 extend downward to form first bent portions 541, respectively. The second bus bar 52 is transversely provided with a plurality of second conductive plates 55. The third bus bar 53 is transversely provided with a plurality of third conductive plates 56. Two ends of each third conductive plate 56 extend upward to form third bent portions 561, respectively. The respective two ends of the first conductive plate 54, the second conductive plate 55 and the third conductive plate 56 are in the same plane. The first conductive plate 54, the second conductive plate 55, and the third conductive plate 56 are vertically screwed to the bus bar assembly 50, respectively. The respective two ends of the first conductive plate 54, the second conductive plate 55 and the third conductive plate 56 have locking holes 542, 552, 562, respectively.

The plurality of current detectors 60 are fitted on the bus bar assembly 50 and electrically connected with the panel 20 respectively for detecting the input current. In this embodiment, the current detectors 60 are current transformers.

The plurality of electromagnetic switches 70 are disposed in the accommodation space 11 of the case 10 and located at left and right sides of the bus bar assembly 50, respectively. The electromagnetic switches 70 have a plurality of input ends 71 and a plurality of output ends 72 at respective two sides thereof. The input ends 71 are connected to the locking holes 542, 552, 562 of the first conductive plates 54, the second conductive plates 55 and the third conductive plates 56 with bolts 73, respectively. The output ends 72 of the electromagnetic switches 70 are electrically connected with the output terminals 41 of the back plate 40.

The network connection and power parameter measuring circuit board 80 is disposed at one side of the case 10, and is electrically connected with the panel 20, the current detectors 60 and the electromagnetic switches 70 for measuring various values of the external power supply, such as the power, voltage, current, frequency and phase of the external power supply. The circuit board 80 is provided with a plurality of transmission terminals 81.

The power converter 90 is disposed between the front plate 30 and the panel 20. The power converter 90 is electrically connected with the main switch 21 and the network connection and power parameter measuring circuit board 80 for converting the external power supply into a low-voltage control power supply. In this embodiment, the low-voltage control power supply is a single-phase 24V DC power supply for supplying power to the network connection and power parameter measuring circuit board 80 and the panel 20.

Figure 5:
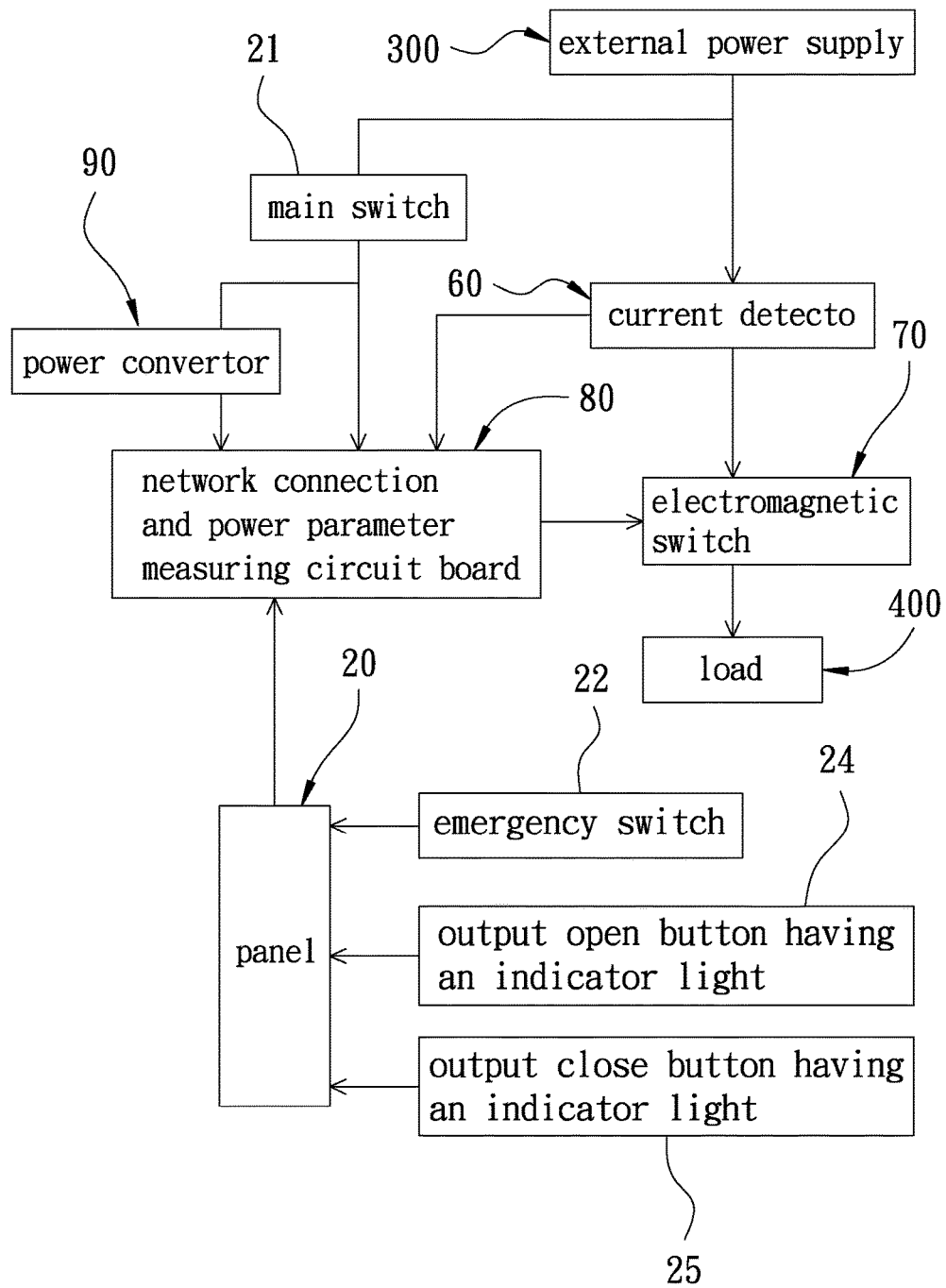
FIG. 5 is a block diagram in accordance with the first embodiment of the present invention.

FIG. 5 is a block diagram in accordance with the first embodiment of the present invention. The user first turns on the main switch 21. At this time, the external power supply 300 is input through the bus bar assembly 50 and then converted into direct current via the power converter 90, and the panel 20 is turned on at a low voltage. In this embodiment, only the voltage of 24 V can be turned on and then the output close button 25 having the indicator light is pressed, so that the output close button 25 having the indicator light blinks. At this time, the network connection and power parameter measuring circuit board 80 checks whether the input voltage is phase failure, phase sequence, whether the input voltage is too high or too low, whether the input frequency is too high or too low, power imbalance (caused by phase angle and voltage), harmonic factor, and so on. After confirming that the input voltage is normal, the output close button 25 having the indicator light will stop blinking and continue to illuminate. Next, the output open button 24 having the indicator light is pressed. At this time, the electromagnetic switches 70 are turned on in sequence in accordance with the setting, and the current is transmitted to a corresponding load 400 of the electromagnetic switches 70. For example, if the load is a power supply apparatus having master-slave control, the slaves are first turned on in order from far to near and then the master is turned on. The current detectors 60 detect whether the input current is normal and calculate the power factor, the power consumption, and the carbon emissions through the circuit board 80 and display it on the display screen 23, so that the display screen 23 can display the data obtained by the network connection and the power parameter measuring circuit board 80 for the user to know the power consumption of the input power supply and the load so as to maintain the power quality.

When the user presses the output close button 25 having the indicator light, the electromagnetic switches 70 are turned off in sequence in accordance with the setting. If the load is a power supply apparatus having master-slave control, the master is first turned off and then the slaves are turned off in order from near to far. Therefore, the electromagnetic switches 70 can be turned on/off in sequence in accordance with the setting, without manual operations. This way can avoid the electromagnetic switches 70 from being wrongly turned on/off manually to result in malfunction or abnormality. When there is an the emergency or the output close button 25 having the indicator light malfunctions, the user may press the emergency switch 22 so that the electromagnetic switches 70 will be turned off at the same time. Therefore, the high-voltage power supply electromagnetic switches 70 are turned on/off through the low-voltage power supply panel 20 in an isolated manner, so that the user won't get contact with the high-voltage power supply. It is safer for use.

Figure 6:
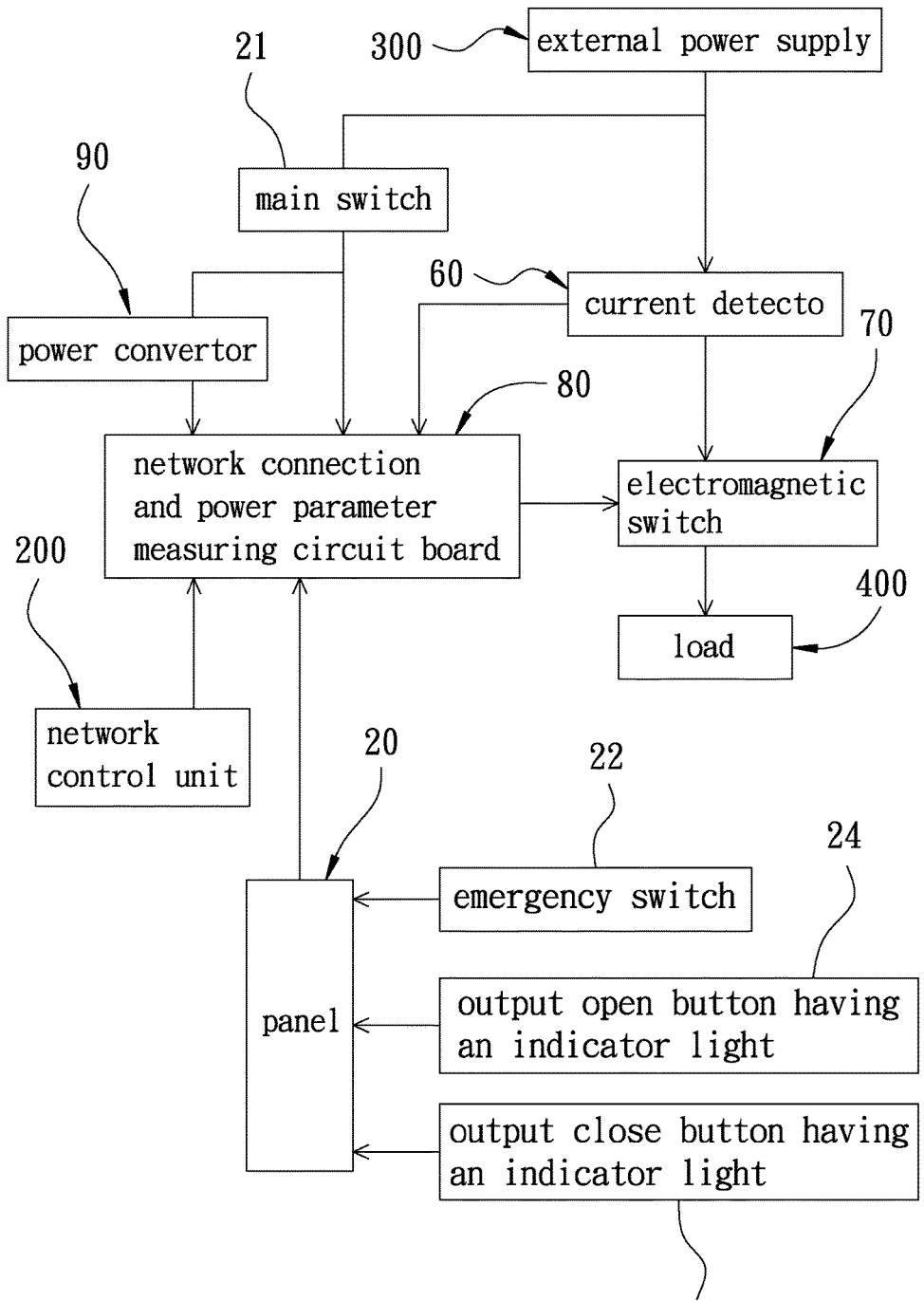
FIG. 6 is a block diagram in accordance with a second embodiment of the present invention.

FIG. 6 is a block diagram in accordance with a second embodiment of the present invention. The second embodiment is substantially similar to the first embodiment with the exceptions described hereinafter. The transmission terminals 81 are electrically connected with a network control unit 200. Therefore, the data of the network connection and power parameter measuring circuit board 80 is transmitted to the network control unit 200. In addition to the remote control of the electromagnetic switches 70 by using the network control unit 200, the user can monitor the power quality and improve the safety of the use. No matter the direct operation via the panel 20 or the remote operation via the network control unit 200, the real-time operation and monitoring of the use of the load 400 achieve the purpose of the power supply safety control, meeting the network and automation requirements of the Industry 4.0. The priority of the emergency switch 22 is still higher than that of the network control unit 200 when the output is controlled by the network control unit 200.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A programmable AC power distribution unit, comprising:
   a case, placed on a rack, the case having an accommodation space therein;
   a panel, disposed at a front of the case, the panel being provided with a main switch, an emergency switch and a display screen, the main switch, the emergency switch and the display screen being electrically connected, the main switch being electrically connected in series with the emergency switch;
   a front plate, disposed behind the panel and parallel to the panel, the front plate being located in the accommodation space of the case, the front plate including an insulating plate, the insulating plate having a plurality of first perforations at a middle portion thereof;
   a back plate, disposed at a rear of the case, the back plate being parallel to the panel and the front plate, the back plate being provided with a plurality of output terminals, the back plate having a plurality of second perforations corresponding to the first perforations of the insulating plate, a portion of the back plate, where the second perforations are located, being made of an insulating material;
   a bus bar assembly, having a first end transversely inserted through the first perforations and a second end inserted through the second perforations, the bus bar assembly being located in the accommodation space of the case, the second end of the bus bar assembly extending out of the back plate for connection of an external power supply;
   a plurality of current detectors, fitted on the bus bar assembly, the plurality of current detectors being electrically connected with the panel respectively for detecting input current;
   a plurality of electromagnetic switches, disposed in the accommodation space of the case and located at left and right sides of the bus bar assembly respectively, input ends of the electromagnetic switches being electrically connected with the bus bar assembly respectively, output ends of the electromagnetic switches being electrically connected with the output terminals of the back plate; and
   a network connection and power parameter measuring circuit board, disposed at one side of the case, the network connection and power parameter measuring circuit board being electrically connected with the panel, the current detectors and the electromagnetic switches for measuring various power values of the external power supply.

2. The programmable AC power distribution unit as claimed in claim 1, wherein the panel is provided with an output open button having an indicator light and an output close button having an indicator light, the output open button having the indicator light is configured to turn on the electromagnetic switches, and the output close button having the indicator light is configured to turn off the electromagnetic switches.

3. The programmable AC power distribution unit as claimed in claim 1, further comprising a power converter, the power converter being disposed between the front plate and the panel, the power converter being electrically connected with the main switch and the network connection and power parameter measuring circuit board.

4. The programmable AC power distribution unit as claimed in claim 1, wherein the network connection and power parameter measuring circuit board is provided with a plurality of transmission terminals.

5. The programmable AC power distribution unit as claimed in claim 1, wherein the bus bar assembly includes a first bus bar, a second bus bar and a third bus bar, the first bus bar is disposed above the second bus bar, and the third bus bar is disposed below the second bus bar.

6. The programmable AC power distribution unit as claimed in claim 5, wherein the first bus bar is transversely provided with a plurality of first conductive plates, the second bus bar is transversely provided with a plurality of second conductive plates, the third bus bar is transversely provided with a plurality of third conductive plates, respective two ends of the first conductive plates, the second conductive plates and the third conductive plates have locking holes for insertion of bolts so that the respective two ends of the first conductive plates, the second conductive plates and the third conductive plates are fixed to the input ends of the corresponding electromagnetic switches.

7. The programmable AC power distribution unit as claimed in claim 6, wherein the two ends of each first conductive plate extend downward to form first bent portions respectively, two ends of each third conductive plate extend upward to form third bent portions respectively, and the respective two ends of the first conductive plates, the second conductive plates and the third conductive plates are in the same plane.

8. The programmable AC power distribution unit as claimed in claim 1, wherein the front plate has mounting holes at two sides thereof, and each of the mounting holes is provided with a cooling fan.

9. The programmable AC power distribution unit as claimed in claim 1, wherein the front plate further includes an insulating sheet, and the insulating sheet is disposed between the insulating plate and the front plate.

* * * * *